United States Patent
Oe et al.

(10) Patent No.: US 9,816,407 B2
(45) Date of Patent: Nov. 14, 2017

(54) VARIABLE VALVE TIMING CONTROL DEVICE FOR INTERNAL COMBUSTION ENGINE

(71) Applicant: DENSO CORPORATION, Kariya, Aichi-pref. (JP)

(72) Inventors: Shuhei Oe, Nishio (JP); Shota Toda, Nishio (JP); Yoshiki Endo, Toyota (JP); Yuu Yokoyama, Okazaki (JP); Toshiki Fujiyoshi, Kariya (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 14/884,061

(22) Filed: Oct. 15, 2015

(65) Prior Publication Data
US 2016/0108771 A1    Apr. 21, 2016

(30) Foreign Application Priority Data
Oct. 17, 2014 (JP) ................................. 2014-212407

(51) Int. Cl.
*F01L 1/344* (2006.01)
*F02D 13/02* (2006.01)

(52) U.S. Cl.
CPC ........ *F01L 1/3442* (2013.01); *F02D 13/0238* (2013.01); *F01L 2001/34456* (2013.01); *Y02T 10/18* (2013.01)

(58) Field of Classification Search
CPC ............. F01L 1/3442; F01L 200/34453; F01L 2001/34456; F02D 13/0219; F02D 13/0238; Y02T 10/18
USPC ................................ 123/90.15, 90.16, 90.17
See application file for complete search history.

(56) References Cited

U.S. PATENT DOCUMENTS

| | | | | |
|---|---|---|---|---|
| 5,738,056 A | * | 4/1998 | Mikame | ................ F01L 1/3442 123/90.17 |
| 8,464,672 B2 | * | 6/2013 | Takemura | ............... F01L 1/022 123/90.15 |
| 2002/0078913 A1 | | 6/2002 | Fukuhara et al. | |
| 2010/0269772 A1 | | 10/2010 | Takemura et al. | |
| 2010/0313835 A1 | | 12/2010 | Yamaguchi et al. | |

* cited by examiner

*Primary Examiner* — Phutthiwat Wongwian
*Assistant Examiner* — Loren Edwards
(74) *Attorney, Agent, or Firm* — Nixon & Vanderhye P.C.

(57) ABSTRACT

When a lock demand of a camshaft phase occurs, a control mode of a hydraulic control valve is switched to a locking mode after the camshaft phase is controlled to a lock phase, and a lock pin is moved to a lock position. The camshaft phase is locked at the lock phase, and timing advance and timing retard chambers communicate with each other through a back space. In this state, a locking time filling control is executed. In the locking time filling control, the control mode of a hydraulic control valve is switched to a filling mode, the hydraulic oil is supplied to a timing advance chamber, both of the timing advance chamber and the timing retard chamber are filled with the hydraulic oil, the back space is filled with the hydraulic oil, and thereafter the control mode of the hydraulic control valve is returned to the locking mode.

7 Claims, 13 Drawing Sheets

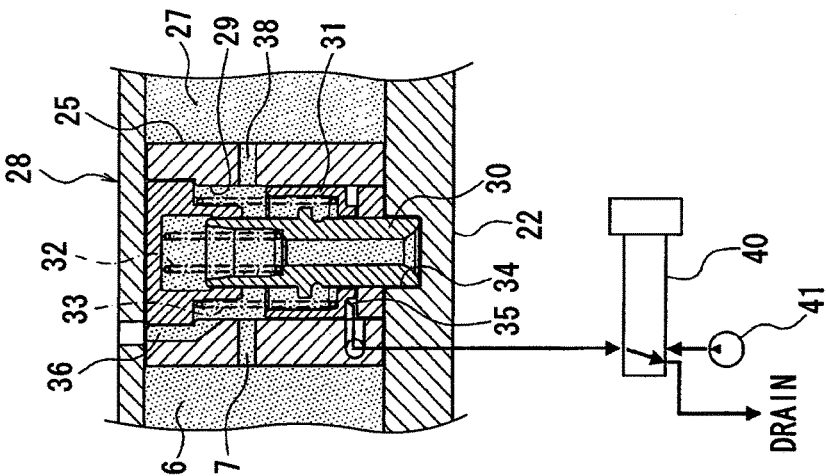
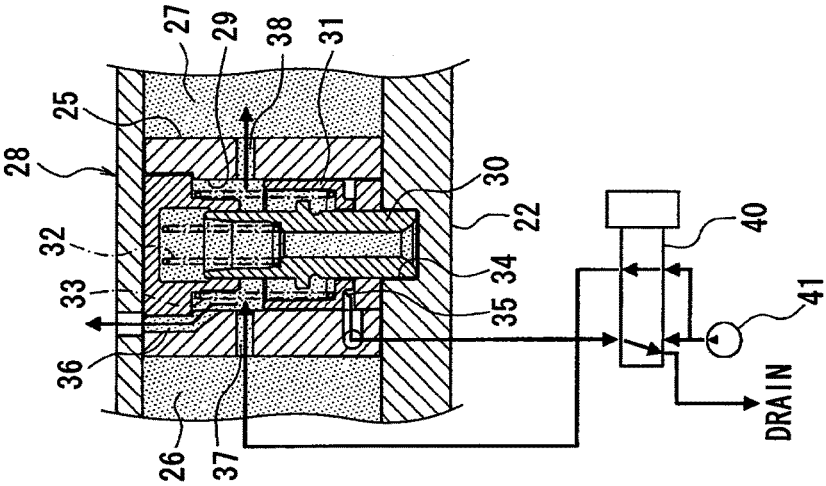
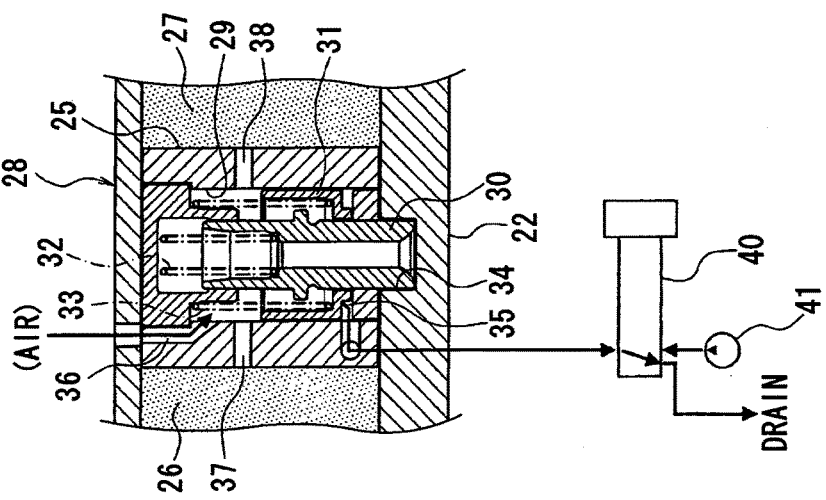

VARIABLE VALVE TIMING CONTROL DEVICE FOR INTERNAL COMBUSTION ENGINE

CROSS REFERENCE TO RELATED APPLICATION

This application is based on Japanese Patent Application No. 2014-212407 filed on Oct. 17, 2014, the disclosure of which is incorporated herein by reference.

TECHNICAL FIELD

The present disclosure is an invention related to a variable valve timing control device for an internal combustion engine which includes a lock mechanism that locks the rotation phase of the camshaft (camshaft phase) with respect to the crankshaft of the internal combustion engine at a predetermined lock phase.

BACKGROUND

An internal combustion engine mounted on a vehicle is provided with a variable valve timing device that changes the valve timing (opening/closing timing) of an intake valve and an exhaust valve by changing the rotation phase of the camshaft (camshaft phase) with respect to the crankshaft of the internal combustion engine in order to improve the output, cut down of the fuel consumption, reduce the emission, and the like.

For example, JP-2010-285986A (U.S. Pat. No. 8,166,937B2) shows a hydraulic drive type variable valve timing device. This device is configured to arrange a lock pin that locks the camshaft phase at a predetermined lock phase, and to lock the camshaft phase by releasing the hydraulic oil pressure of the lock pin to move the lock pin toward the lock position and fitting the lock pin to the fitting hole when a lock demand of the camshaft phase occurs during idling operation and the like for example.

Generally, in order that the lock pin can be easily fitted to the fitting hole, a clearance is arranged between the lock pin and the fitting hole. Therefore, in a state the lock pin is fitted to the fitting hole and the camshaft phase is locked, it is possible that the lock pin vibrates inside the fitting hole by the torque fluctuation of the camshaft and the noise (rattling noise) is generated.

SUMMARY

It is an object of the present disclosure to provide a variable valve timing control device of an internal combustion engine which can suppress the noise caused by vibration of the lock pin at the time of the phase lock.

The variable valve timing control device of the present disclosure includes a hydraulic drive type variable valve timing device that changes the rotation phase of a camshaft (hereinafter referred to as "camshaft phase") with respect to a crankshaft of an internal combustion engine and adjusts the valve timing, a lock mechanism that includes a lock pin movable between a lock position for locking the camshaft phase at a predetermined lock phase and a lock release position for releasing lock of the camshaft phase, and a hydraulic control valve that controls the oil pressure that drives the variable valve timing device and the lock mechanism.

Further, the variable valve timing control device includes a control unit that switches the control mode of the hydraulic control valve among a timing advancing mode for supplying a hydraulic oil to a timing advance chamber of the variable valve timing device and advancing the camshaft phase, a timing retarding mode for supplying the hydraulic oil to a timing retard chamber of the variable valve timing device and retarding the camshaft phase, a holding mode for holding the oil pressure of the timing advance chamber and the timing retard chamber and holding the camshaft phase, a locking mode for releasing the oil pressure of an oil pressure chamber of the lock mechanism and moving the lock pin to the lock position, and a filling mode for filling a space (hereinafter referred to as "back space") formed by movement of the lock pin to the lock position with the hydraulic oil. The control unit executes locking time filling control of switching the control mode to the filling mode and filling the back space with the hydraulic oil in a state the control mode is switched to the locking mode and the lock pin is moved to the lock position, and thereafter returning the control mode to the locking mode when a lock demand of the camshaft phase occurs.

According to the research of the present applicants, it was found out that, when the back space (the space formed by movement of the lock pin to the lock position) was filled with the air in a state the lock pin was moved to the lock position and the camshaft phase was locked, vibration of the lock pin could not be damped much, and the noise (rattling noise) caused by vibration of the lock pin increased.

Therefore, in the present disclosure, in view of that the back space can be filled with the hydraulic oil by the filling mode, it is configured that the control unit executes a locking time filling control of switching the control mode to the filling mode, filling the back space with the hydraulic oil in a state the control mode is switched to the locking mode and the lock pin is moved to the lock position, and thereafter returning the control mode to the locking mode when a lock demand of the camshaft phase occurs.

With such a configuration, at the time of the phase lock (in a state the lock pin is moved to the lock position and the camshaft phase is locked), the back space can be filled with the hydraulic oil by the locking time filling control, and the peripheral part of the lock pin can be filled with the hydraulic oil. Thus, even when vibration of the lock pin may be generated by torque fluctuation of the camshaft at the time of the phase lock, vibration of the lock pin can be damped by the damping effect of the hydraulic oil filled in the back space (the hydraulic oil of the peripheral part of the lock pin), and the noise (rattling noise) caused by vibration of the lock pin at the time of the phase lock can be suppressed.

Further, it may be also configured that the control unit executes stopping time filling control of switching the control mode to the filling mode, filling the back space with the hydraulic oil, and thereafter returning the control mode to the locking mode when a stop demand of the internal combustion engine occurs. With such a configuration, the noise (rattling noise) caused by vibration of the lock pin at the time of the phase lock at the time of engine start of the next time (at the time of the start after idling stop for example) can be suppressed.

BRIEF DESCRIPTION OF THE DRAWINGS

The above and other objects, features and advantages of the present disclosure will become more apparent from the following detailed description made with reference to the accompanying drawings. In the drawings:

FIGS. 5A to 5C are drawings for explaining the locking time filling control of the first embodiment;

DETAILED DESCRIPTION

Figure 1:
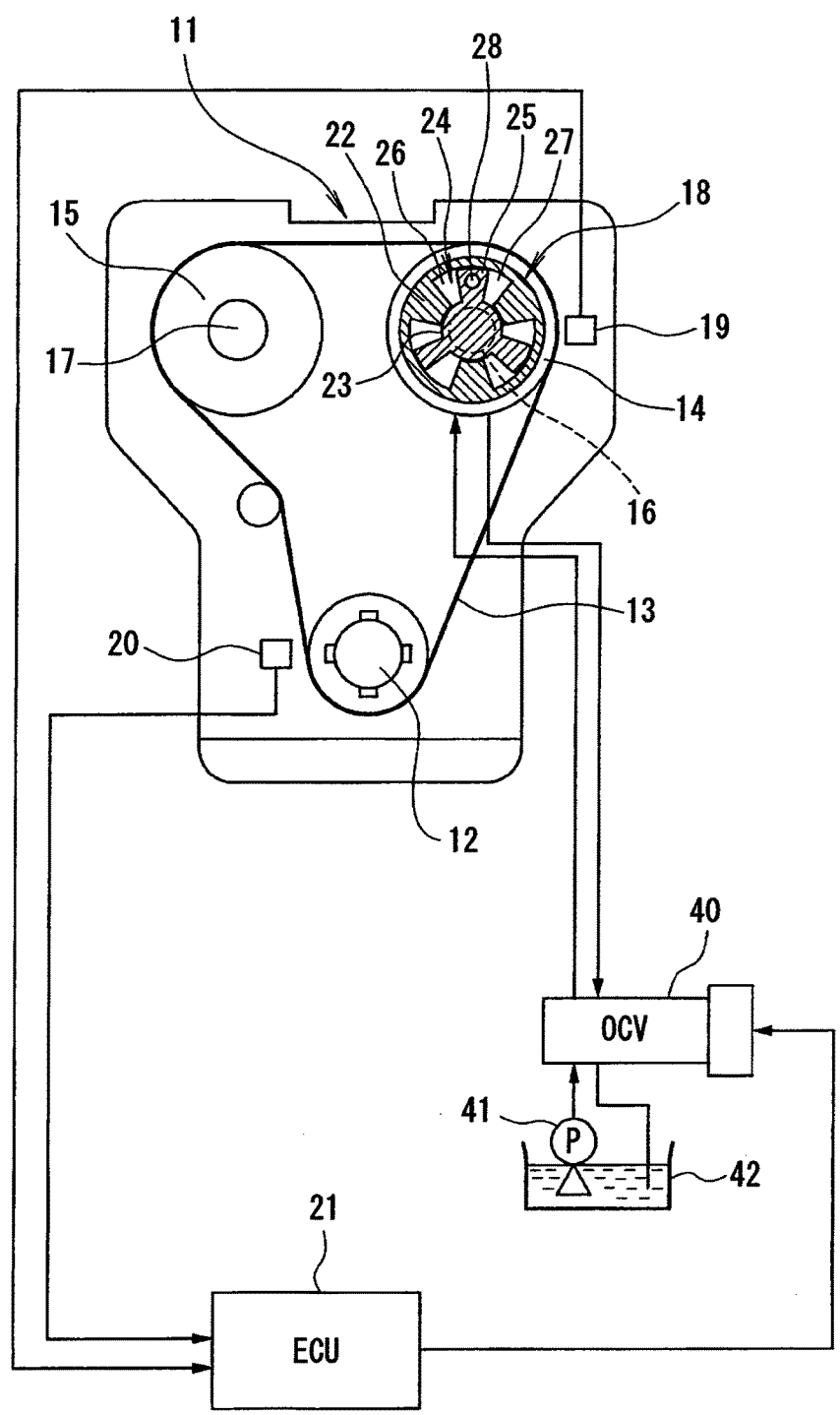
FIG. 1 is a drawing showing a schematic configuration of a variable valve timing control device in the first embodiment of the present disclosure.

Several embodiments of the present disclosure will be explained, hereinafter.

First Embodiment

The first embodiment of the present disclosure will be explained based on FIG. 1 to FIG. 6.

First, a schematic configuration of a variable valve timing control device will be explained based on FIG. 1.

An engine 11 that is an internal combustion engine is configured that the power from a crankshaft 12 is transmitted to an intake side camshaft 16 and an exhaust side camshaft 17 from a timing chain 13 (or a timing belt) through respective sprockets 14, 15. A hydraulic drive type variable valve timing device 18 is arranged in the intake side camshaft 16, and it is configured that the valve timing (open/close timing) of the intake valve (not illustrated) driven to open/close by the intake side camshaft 16 is changed by changing the rotation phase of the intake side camshaft 16 (hereinafter referred to as "camshaft phase") with respect to the crankshaft 12 by this variable valve timing device 18.

Also, a cam angle sensor 19 that outputs a cam angle signal at a specific cam angle is installed on the outer periphery side of the intake side camshaft 16, and a crank angle sensor 20 that outputs a crank angle signal at every specific crank angle is installed on the outer periphery side of the crankshaft 12. The engine rotational speed is detected based on the output signal of this crank angle sensor 20, and the actual camshaft phase (actual valve timing) is detected based on the output signal of the cam angle sensor 19 and the output signal of the crank angle sensor 20.

The output of these sensors 19, 20 and other various sensors (a throttle opening sensor, intake pressure sensor, cooling water temperature sensor, and the like for example) is inputted to an electronic control unit (hereinafter expressed as "ECU") 21. This ECU 21 is formed mainly of a microcomputer, and controls the fuel injection quantity, ignition timing, throttle opening (intake air quantity), and the like according to the engine operation state by executing various programs for engine control stored in a ROM (storage medium) built in.

Also, the ECU 21 calculates the target camshaft phase (target valve timing) according to the engine operation state and the like, and controls the oil pressure that drives the variable valve timing device 18 so that the actual camshaft phase (actual valve timing) agrees with the target camshaft phase.

A housing 22 of the variable valve timing device 18 is arranged so as to rotate integrally with the sprocket 14, and the sprocket 14 and the housing 22 rotate so as to synchronize with the crankshaft 12. On the other hand, a rotor 23 disposed inside the housing 22 is arranged so as to rotate integrally with the intake side camshaft 16. Also, a plurality of vane storing chambers 24 are formed inside the housing 22, a plurality of vanes 25 are formed in the outer peripheral part of the rotor 23, and the respective vane storing chambers 24 are partitioned to a timing advance chamber 26 (an oil pressure chamber for advancing the timing) and a timing retard chamber 27 (an oil pressure chamber for retarding the timing) by the vanes 25 respectively.

Also, in the variable valve timing device 18, a lock mechanism(s) 18 that locks the camshaft phase at a predetermined lock phase is arranged in either one (or a plurality of) vane(s) 25. Here, the lock phase is set to an intermediate lock phase (a camshaft phase suitable to start of the engine 11 for example) positioned between the most timing retarding position and the most timing advancing position of the adjustable range of the camshaft phase. Also, the lock phase is not limited to the intermediate lock phase, and may be set to the most timing retarding position and the most timing advancing position of the adjustable range of the camshaft phase (generally in the middle for example).

Next, a configuration of the lock mechanism 28 will be explained based on FIG. 2.

Figure 2:
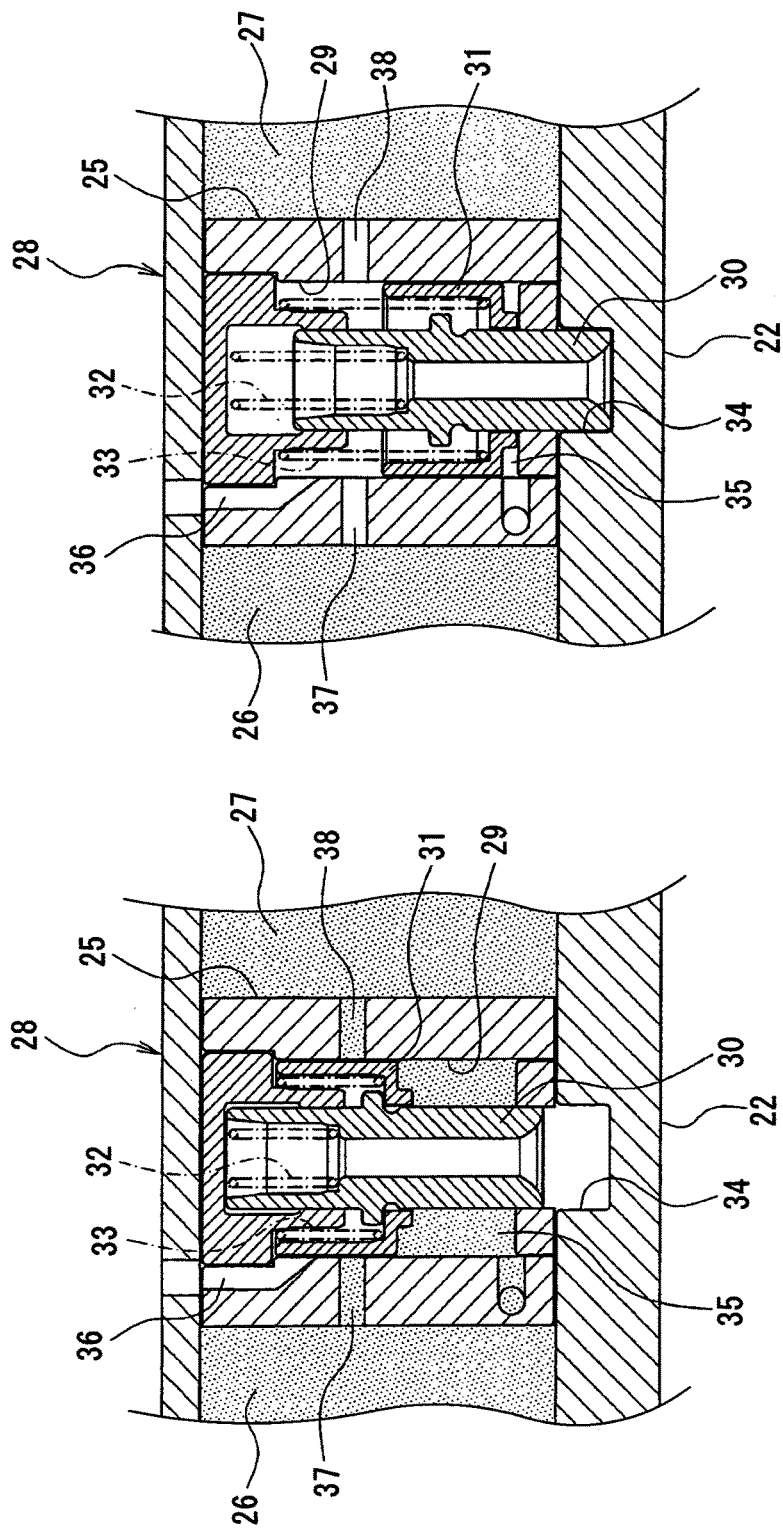
FIG. 2A is a cross-sectional view of an intermediate lock mechanism showing the lock release state.
FIG. 2B is a cross-sectional view of an intermediate lock mechanism showing the lock state.

As shown in FIG. 2, in either one (or a plurality of) vane(s) 25, a lock pin storing hole 29 is arranged, and an inner pin 30 and an outer pin 31 are stored in this lock pin storing hole 29 as a lock pin for locking the relative turning of the housing 22 and the rotor 23 (vane 25). The inner pin 30 is disposed on the center side of the lock pin storing hole 29, and the outer pin 31 is disposed on the outer peripheral side of this inner pin 30. These lock pins (the inner pin 30 and the outer pin 31) are arranged so as to be movable between the lock position (refer to FIG. 2A) for locking the camshaft phase at the lock phase and the lock release position (refer to FIG. 2A) for releasing the lock of the camshaft phase, and are energized to the locking direction (the direction toward the lock position) by springs 32, 33 respectively.

As shown in FIG. 2B, it is configured that the lock pin (the inner pin 30 and the outer pin 31) moves to the lock position, the distal end of the inner pin 30 is fitted to a fitting hole 34 of the housing 22, thereby the relative turning of the housing 22 and the rotor 23 (the vane 25) is prevented, and the camshaft phase is locked at the lock phase.

On the other hand, as shown FIG. 2A, it is configured that the lock pin (the inner pin 30 and the outer pin 31) moves to the lock release position, the distal end of the inner pin 30 comes out from the fitting hole 34 of the housing 22, thereby the relative turning of the housing 22 and the rotor 23 (the vane 25) is allowed, and the lock of the camshaft phase is released.

Also, on the opposite side of the spring 33 with respect to the outer pin 31 out of the inside of the lock pin storing hole 29, an oil pressure chamber for lock release 35 is formed which is surrounded by the inner peripheral surface of the lock pin storing hole 29, the outer peripheral surface of the inner pin 30, the outer pin 31, and the like. Further, in the vane 25, an atmospheric air communication path 36 that communicates the atmospheric air side and the lock pin storing hole 29 each other, a timing advance communication path 37 that communicates the timing advance chamber 26 and the lock pin storing hole 29 each other, and a timing retard communication path 38 that communicates the timing retard chamber 27 and the lock pin storing hole 29 each other are formed.

As shown in FIG. 2A, when the oil pressure chamber for lock release 35 is filled with the hydraulic oil and the oil pressure of the oil pressure chamber for lock release 35 is increased, the outer pin 31 moves to the lock release direction (the direction toward the lock release position) by the oil pressure, the collar of the inner pin 30 is pushed by the outer pin 31, the inner pin 30 moves to the lock release direction, and the inner pin 30 and the outer pin 31 move to the lock release position. Thus, the distal end of the inner pin 30 comes out from the fitting hole 34 of the housing 22, and the lock of the camshaft phase is released (relative turning of the housing 22 and the rotor 23 is allowed). Also, when the inner pin 30 and the outer pin 31 move to the lock release position, the communication paths 36 to 38 are closed by the outer pin 31.

On the other hand, as shown in FIG. 2B, when the oil pressure of the oil pressure chamber for lock release 35 is released, the outer pin 31 moves to the lock direction by the spring force of the spring 33, the inner pin 30 moves to the lock direction by the spring force of the spring 32, and the inner pin 30 and the outer pin 31 move to the lock position. Thus, the distal end of the inner pin 30 is fitted to the fitting hole 34 of the housing 22, and the camshaft phase is locked at the lock phase (relative turning of the housing 22 and the rotor 23 is prevented).

Also, when the inner pin 30 and the outer pin 31 move to the lock position, first, the atmospheric air communication path 36 is opened by the outer pin 31, and the atmospheric air (air) is introduced to a space (hereinafter referred to as "back space") 39 that is formed by movement of the inner pin 30 and the outer pin 31 to the lock position. Thus, the inner pin 30 and the outer pin 31 can move smoothly. Also, the timing advance communication path 37 and the timing retard communication path 38 are opened by the outer pin 31, and the timing advance chamber 26 and the timing retard chamber 27 come to a state of communicating with each other through the back space 39.

As shown in FIG. 1, a hydraulic control valve 40 that controls the oil pressure that drives the variable valve timing device 18 and the intermediate lock mechanism 28 is formed of a hydraulic control valve that integrates the hydraulic control function for the phase control which controls the oil pressure that drives the camshaft phase and the hydraulic control function for the lock control which controls the oil pressure that drives the lock pin (an electromagnetic drive type spool valve for example). The oil (hydraulic oil) inside an oil pan 42 is pumped up by an oil pump 41 that is driven by the power of the engine 11, and is supplied to the hydraulic control valve 40.

Figure 3:
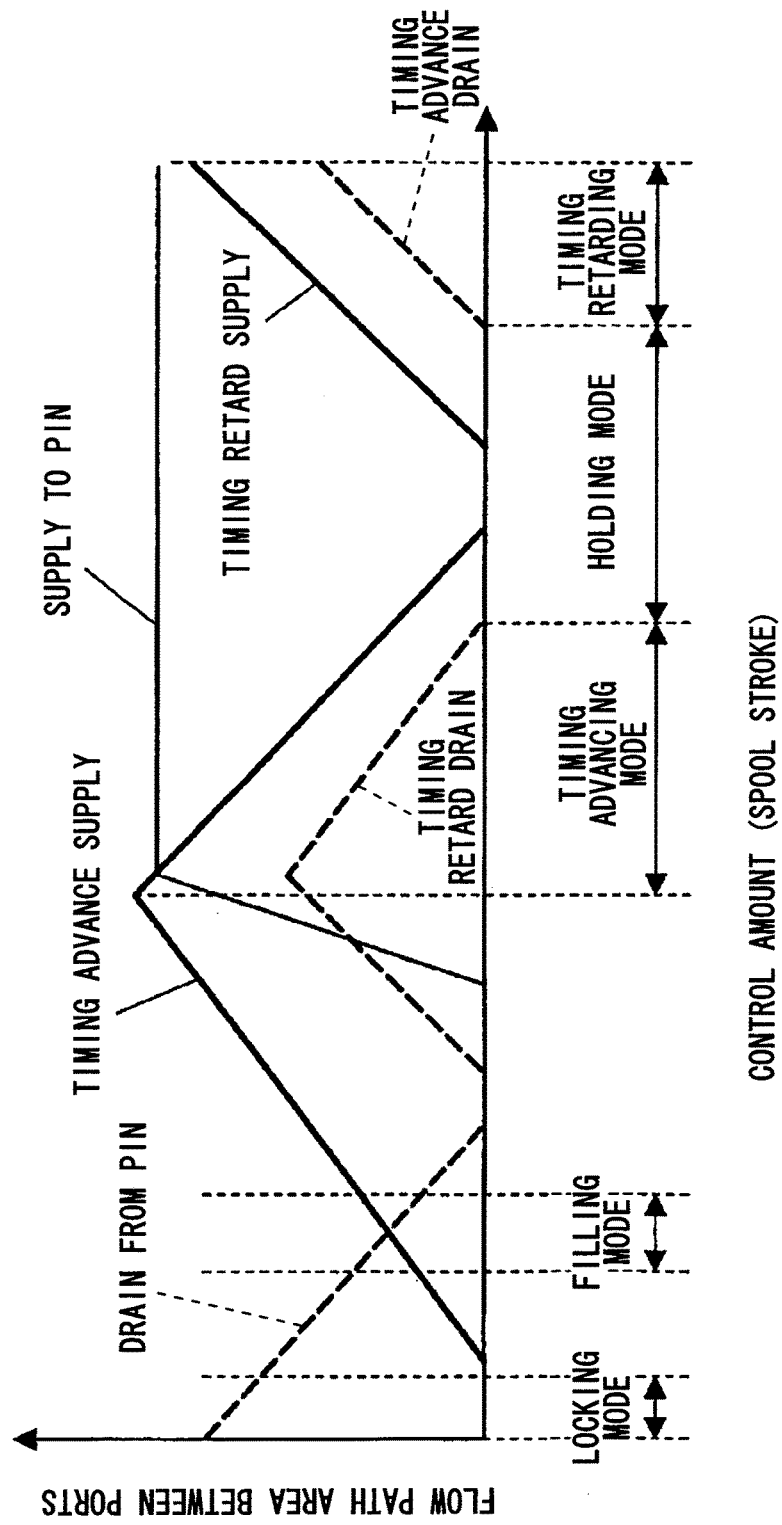
FIG. 3 is a drawing explaining the control mode of a hydraulic control valve.

As shown in FIG. 3, a control amount (spool stroke) of the hydraulic control valve 40 is separated into five control areas of the locking mode, filling mode, timing advancing mode, holding mode, and timing retarding mode. The ECU 21 (control unit) switches the control mode of the hydraulic control valve 40 among the locking mode, filling mode, timing advancing mode, holding mode, and timing retarding mode, and sets the control amount of the hydraulic control valve 40 within the control area of the control mode in question.

In the control area of the locking mode (refer to FIG. 5A), the pin port that communicates with the oil pressure chamber for lock release 35 is connected to the drain port, the oil pressure of the oil pressure chamber for lock release 35 is released, and the lock pin (the inner pin 30 and the outer pin 31) is moved to the lock position by the springs 32, 33. Thus, the distal end of the inner pin 30 is fitted to the fitting hole 34, the camshaft phase is locked at the lock phase, and the timing advance chamber 26 and the timing retard chamber 27 come to a state of communicating with each other through the back space 39.

In the control area of the filling mode (refer to FIG. 5B), the lock pin (the inner pin 30 and the outer pin 31) is held at the lock position while the pin port that communicates with the oil pressure chamber for lock release 35 is connected to the drain port, thereby the state of locking the camshaft phase is held, and the state the timing advance chamber 26 and the timing retard chamber 27 communicate with each other through the back space 39 is held. In this state, the timing advance port that communicates with the timing advance chamber 26 is connected to the supply port, the hydraulic oil is supplied to the timing advance chamber 26, and both of the timing advance chamber 26 and the timing retard chamber 27 are filled with the hydraulic oil (at this time, the back space 39 is also filled with the hydraulic oil).

In the control area other than the locking mode and the filling mode (the control area of the timing advancing mode, holding mode, and timing retarding mode), the pin port that communicates with the oil pressure chamber for lock release 35 is connected to the supply port, the oil pressure chamber for lock release 35 is filled with the hydraulic oil, and the lock pin (the inner pin 30 and the outer pin 31) is moved to the lock releasing position by the oil pressure of the oil pressure chamber for lock release 35. Thus, the distal end of the inner pin 30 comes out from the fitting hole 34, the lock of the camshaft phase is released, and the communication paths 36-38 are closed.

In the control area of the timing advancing mode, the timing retard port that communicates with the timing retard chamber 27 is connected to the drain port, the oil pressure of the timing retard chamber 27 is released, the timing advance port that communicates with the timing advance chamber 27 is connected to the supply port, the hydraulic oil is supplied to the timing advance chamber 26, and the camshaft phase is advanced. At this time, the supply amount of the hydraulic oil to the timing advance chamber 26 is changed according to the control amount (spool stroke) of the hydraulic control valve 40, and the timing advancing rate of the camshaft phase is changed.

In the control area of the holding mode, the timing advance port that communicates with the timing advance chamber 26 and the timing retard port that communicates with the timing retard chamber 27 and the drain port are disconnected, the oil pressure of the timing advance chamber 26 and the timing retard chamber 27 is held, and the camshaft phase is held so as not to move.

In the control area of the timing retarding mode, the timing advance port that communicates with the timing advance chamber 26 is connected to the drain port, the oil pressure of the timing advance chamber 26 is released, the timing retard port that communicates with the timing retard chamber 27 is connected to the supply port, the hydraulic oil is supplied to the timing retard chamber 27, and the camshaft phase is retarded. At this time, the supply amount of the hydraulic oil to the timing retard chamber 27 is changed according to the control amount (spool stroke) of the hydraulic control valve 40, and the timing retarding rate of the camshaft phase is changed.

The ECU 21 executes the phase F/B control in which the target camshaft phase (target valve timing) is calculated according to the engine operation state and the like, the control amount of the hydraulic control valve 40 is F/B controlled so that the actual camshaft phase (actual valve timing) agrees with the target camshaft phase, and the oil pressure supplied to the timing advance chamber 26 and the timing retard chamber 27 of the variable valve timing device 18 is F/B controlled. Here, "F/B" means "feedback" (the same is hereinafter applied). The control area of this phase F/B control straddles the control area of the timing advancing mode, holding mode, and timing retarding mode.

Also, when a lock demand of the camshaft phase occurs during the idling operation and the like for example, first, the ECU 21 sets the target camshaft phase to the lock phase, the actual camshaft phase is controlled to the lock phase (target camshaft phase) by the phase F/B control. Thereafter, the control mode of the hydraulic control valve 40 is switched to the locking mode (the control amount of the hydraulic control valve 40 is set to within the control area of the locking mode), and the lock pin (the inner pin 30 and the outer pin 31) is moved to the lock position. Thus, the distal end of the inner pin 30 is fitted to the fitting hole 34, and the camshaft phase is locked at the lock phase.

In the meantime, in order that the inner pin 30 can be easily fitted to the fitting hole 34, a clearance is arranged between the inner pin 30 and the fitting hole 34. Therefore, in the state the inner pin 30 is fitted to the fitting hole 34 and the camshaft phase is locked, it is possible that the inner pin 30 vibrates inside the fitting hole 34 by torque fluctuation of the camshaft 16 and the noise (rattling noise) is generated.

As described above, when the lock pin (the inner pin 30 and the outer pin 31) moves to the lock position, the atmospheric air communication path 36 is opened by the outer pin 31, and the atmospheric air (air) is introduced to the back space 39 (a space formed by movement of the lock pin to the lock position) (refer to FIG. 5A). According to research by the present applicants, it was found out that, when the back space 39 was filled with the air in a state the lock pin (the inner pin 30 and the outer pin 31) was moved to the lock position and the camshaft phase was locked, vibration of the inner pin 30 could not be damped much, and the noise (rattling noise) caused by vibration of the inner pin 30 increased.

Therefore, in the present embodiment, watching that the back space 39 can be filled with the hydraulic oil by the filling mode, the control described below is performed by executing the locking time filling control routine of FIG. 6 described below by the ECU 21. When a lock demand of the camshaft phase occurs, the locking time filling control is executed in which, in a state the control mode is switched to the locking mode and the lock pin (the inner pin 30 and the outer pin 31) is moved to the lock position, the control mode is switched to the filling mode, the back space 39 is filled with the hydraulic oil, and thereafter the control mode is returned to the locking mode.

Figure 4:
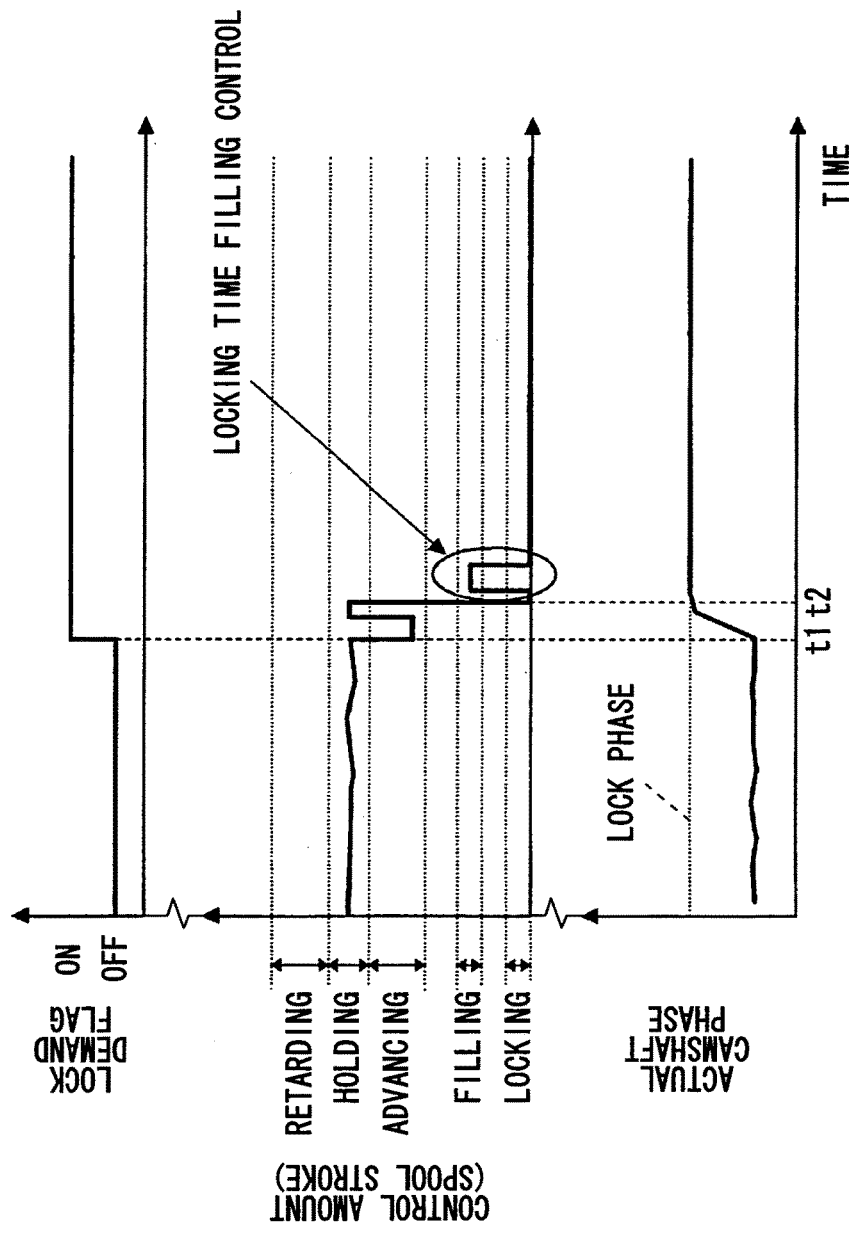
FIG. 4 is a time chart showing an execution example of the locking time filling control of the first embodiment.

More specifically, as shown in FIG. 4, at the time point t1 when a lock demand of the camshaft phase occurs (the time point when the lock demand flag is switched to ON), the target camshaft phase is set to the lock phase, and the actual camshaft phase is controlled to the lock phase (target camshaft phase) by the phase F/B control. For example, when the actual camshaft phase is advanced and is controlled to the lock phase, the control mode of the hydraulic control valve 40 is switched to the timing advancing mode and is thereafter returned to the holding mode.

Thereafter, at the time point t2 when it is determined that the actual camshaft phase has generally agreed with the lock phase, the control mode of the hydraulic control valve 40 is switched to the locking mode (the control amount of the hydraulic control valve 40 is set to within the control area of the locking mode), and the lock pin (the inner pin 30 and the outer pin 31) is moved to the lock position (refer to FIG. 5A). Thus, the distal end of the inner pin 30 is fitted to the fitting hole 34, the camshaft phase is locked at the lock phase, and the timing advance chamber 26 and the timing retard chamber 27 come to a state of communicating with each other through the back space 39.

In this state, the locking time filling control is executed. In this locking time filling control, first, the control mode of the hydraulic control valve 40 is switched to the filling mode (the control amount of the hydraulic control valve 40 is set to within the control area of the filling mode), the hydraulic oil is supplied to the timing advance chamber 26, both of the timing advance chamber 26 and the timing retard chamber 27 are filled with the hydraulic oil, and the back space 39 is filled with the hydraulic oil (refer to FIG. 5B). After continuing this filling mode for a predetermined time, the control mode of the hydraulic control valve 40 is returned to the locking mode, and supply of the hydraulic oil to the timing advance chamber 26 is stopped (refer to FIG. 5C).

By this locking time filling control, the back space 39 is filled with the hydraulic oil, the peripheral part (the peripheral part on the opposite side of the distal end) of the inner pin 30 can be filled with the hydraulic oil, and vibration of the inner pin 30 can be damped by the damping effect of the hydraulic oil filled in the back space 39 (the hydraulic oil in the peripheral part of the inner pin 30).

Below, the process contents of the locking time filling control routine of FIG. 6 executed by the ECU 21 in the present first embodiment will be explained.

Figure 6:
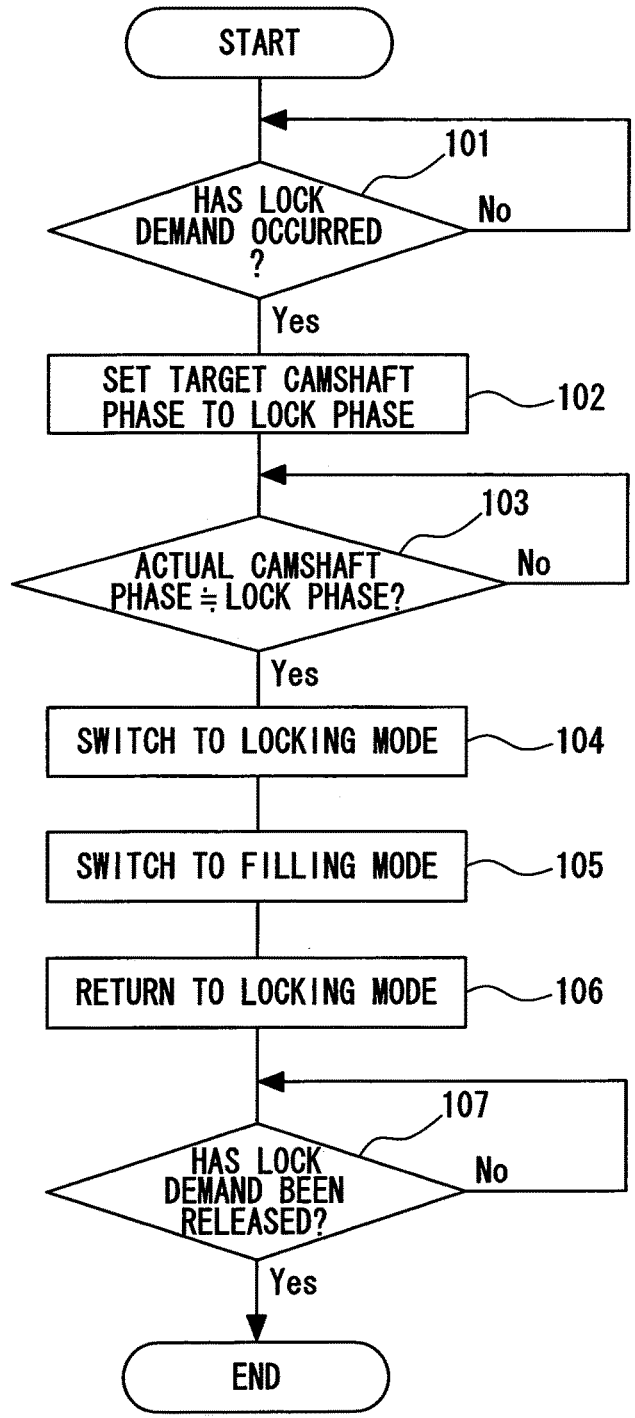
FIG. 6 is a flowchart showing the flow of the process of a locking time filling control routine of the first embodiment.

The locking time filling control routine shown in FIG. 6 is executed repeatedly at a predetermined period during the power-on period of the electric source of the ECU 21.

When the present routine is started, first, in Step 101, whether or not a lock demand of the camshaft phase occurs is determined, the process proceeds to Step 102 at the time point when it is determined that the lock demand has occurred, the target camshaft phase is set to the lock phase, and the actual camshaft phase is controlled to the lock phase (target camshaft phase) by the phase F/B control.

Thereafter, the process proceeds to Step 103, and whether or not the actual camshaft phase has generally agreed with the lock phase is determined by whether or not the difference (absolute value) of the actual camshaft phase and the lock phase has become equal to or less than a predetermined value for example.

In this Step 103, at the time point when it is determined that the actual camshaft phase has generally agreed with the lock phase, the process proceeds to Step 104, the control mode of the hydraulic control valve 40 is switched to the locking mode, and the lock pin (the inner pin 30 and the outer pin 31) is moved to the lock position. Thus, the distal end of the inner pin 30 is fitted to the fitting hole 34, the camshaft phase is locked at the lock phase, and the timing advance chamber 26 and the timing retard chamber 27 come to a state of communicating with each other through the back space 39.

Thereafter, in Steps 105, 106, the locking time filling control is executed. First, the process proceeds to Step 105, the control mode of the hydraulic control valve 40 is switched to the filling mode, the hydraulic oil is supplied to the timing advance chamber 26, both of the timing advance chamber 26 and the timing retard chamber 27 are filled with the hydraulic oil, and the back space 39 is filled with the hydraulic oil. This filling mode is continued for a predetermined time (the time required for filling the back space 39 with the hydraulic oil). Thereafter, the process proceeds to Step 106, the control mode of the hydraulic control valve 40 is returned to the locking mode, and supply of the hydraulic oil to the timing advance chamber 26 is stopped.

Thereafter, the process proceeds to Step 107, whether or not the lock demand of the camshaft phase has been released is determined, and, at the time point when it is determined that the lock demand has been released, the present routine is finished.

In the present first embodiment explained above, it is configured to execute the locking time filling control of switching the control mode to the filling mode and filling the back space 39 with the hydraulic oil in a state the control mode is switched to the locking mode and the lock pin (the inner pin 30 and the outer pin 31) is moved to the lock position and thereafter returning the control mode to the locking mode when a lock demand of the camshaft phase occurs. With such a configuration, at the time of the phase lock (in a state the lock pin is moved to the lock position and the camshaft phase is locked), the back space 39 can be filled with the hydraulic oil by the locking time filling control and the peripheral part (the peripheral part on the opposite side of the distal end) of the inner pin 30 can be filled with the hydraulic oil. Thus, even when vibration of the inner pin 30 may be generated by torque fluctuation of the camshaft 16 at the time of the phase lock, vibration of the inner pin 30 can be damped by the damping effect of the hydraulic oil filled in the back space 39 (the hydraulic oil of the peripheral part of the inner pin 30), and the noise (rattling noise) caused by vibration of the inner pin 30 at the time of the phase lock can be suppressed.

Second Embodiment

Next, the second embodiment of the present disclosure will be explained using FIG. 7 and FIG. 8. However, explanation of the portion substantially same to the first embodiment described above will be omitted or simplified, and the portion different from the first embodiment described above will be mainly explained.

Figure 7:
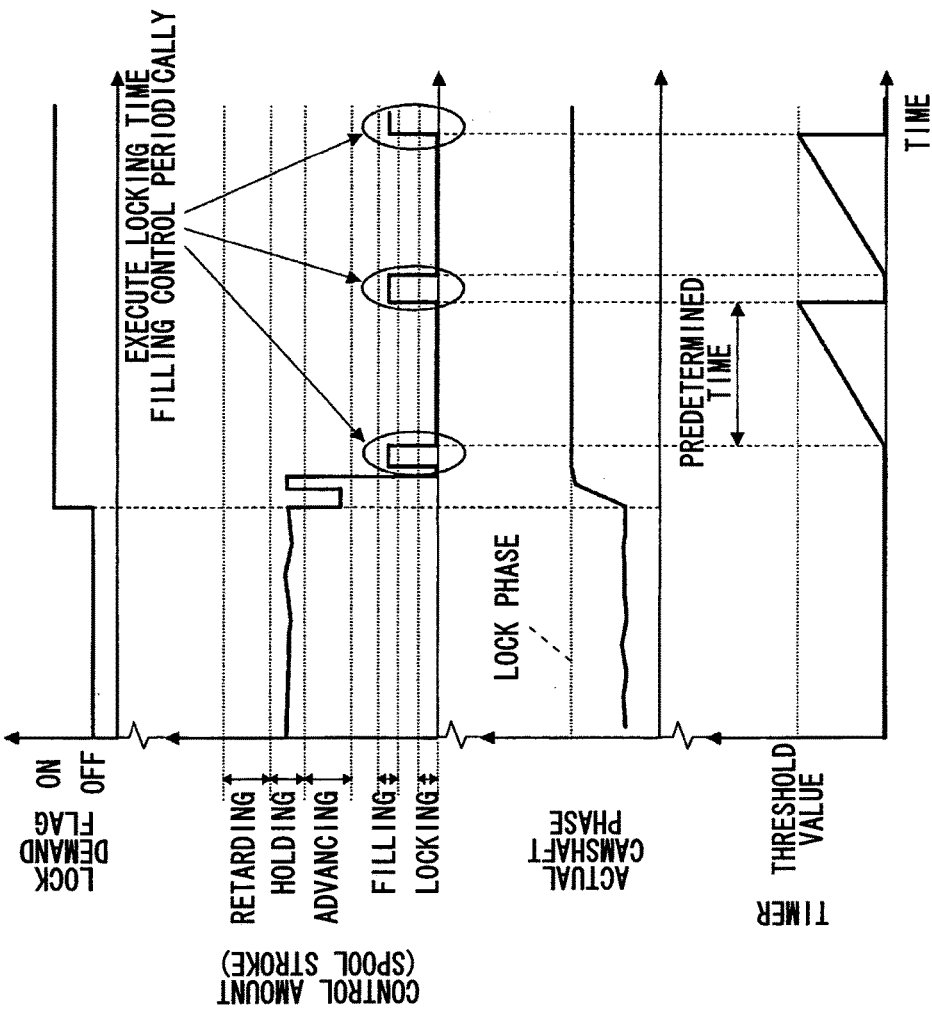
FIG. 7 is a time chart showing an execution example of the locking time filling control of the second embodiment.

In the present second embodiment, by executing the locking time filling control routine of FIG. 8 described below by the ECU 21, as shown in FIG. 7, it is configured to execute the locking time filling control repeatedly every time a predetermined time elapses after executing the locking time filling control until a lock demand is released in a state the control mode is switched to the locking mode when the lock demand of the camshaft phase occurs.

Below, the process contents of the locking time filling control routine of FIG. 8 executed by the ECU 21 in the present second embodiment will be explained.

Figure 8:
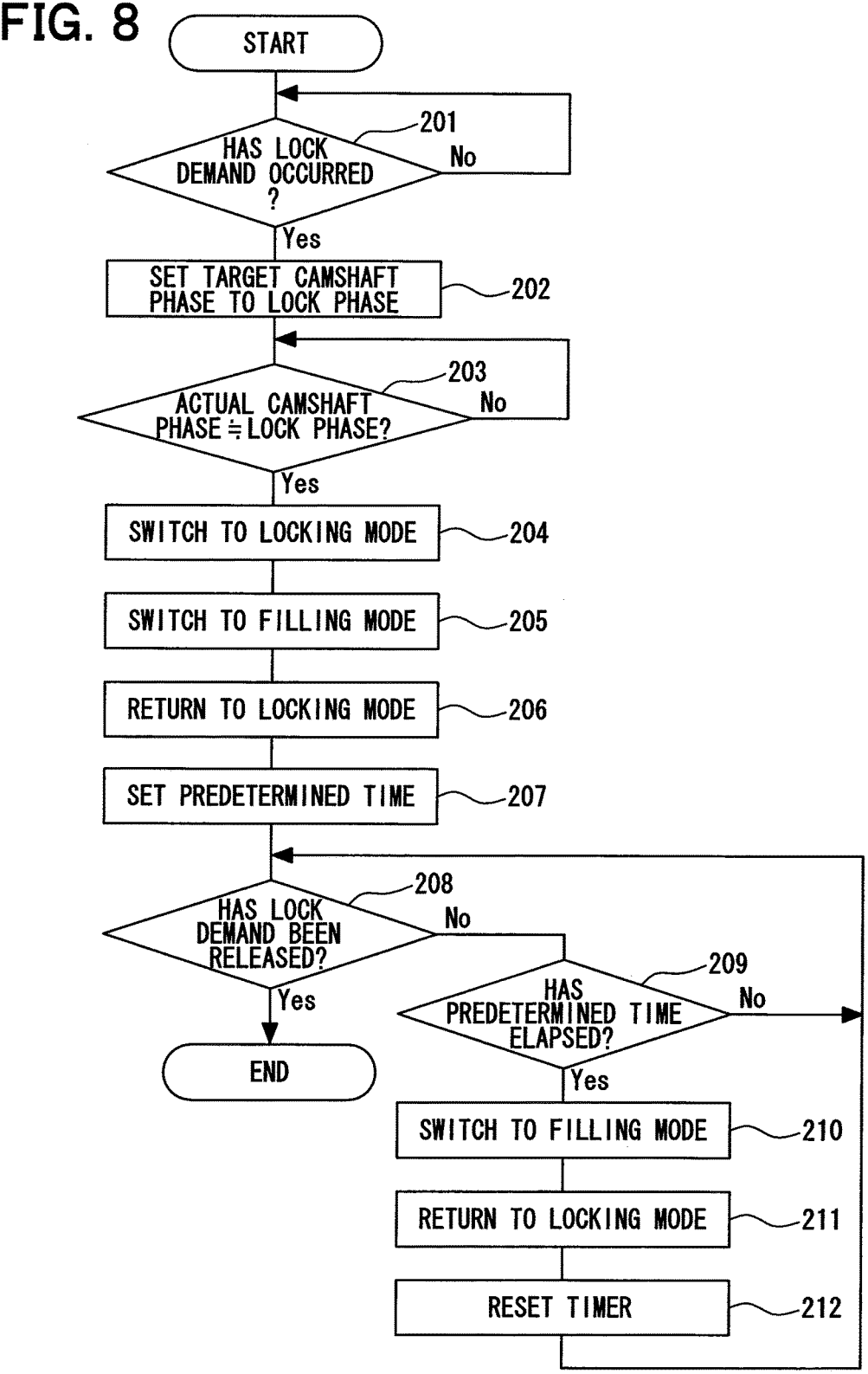
FIG. 8 is a flowchart showing the process flow of a locking time filling control routine of the second embodiment.

In the locking time filling control routine shown in FIG. 8, first, in Step 201, whether or not a lock demand of the camshaft phase occurs is determined, the process proceeds to Step 202 at the time point when it is determined that the lock demand has occurred, the target camshaft phase is set to the lock phase, and the actual camshaft phase is controlled to the lock phase (target camshaft phase) by the phase F/B control.

Thereafter, the process proceeds to Step 203, and whether or not the actual camshaft phase has generally agreed with the lock phase is determined. At the time point when it is determined that the actual camshaft phase has generally agreed with the lock phase, the process proceeds to Step 204, the control mode of the hydraulic control valve 40 is switched to the locking mode, and the lock pin (the inner pin 30 and the outer pin 31) is moved to the lock position.

Thereafter, the locking time filling control is executed. First, in Step 205, the control mode of the hydraulic control valve 40 is switched to the filling mode, the hydraulic oil is supplied to the timing advance chamber 26, both of the timing advance chamber 26 and the timing retard chamber 27 are filled with the hydraulic oil, and the back space 39 is filled with the hydraulic oil. Thereafter, in Step 206, the control mode of the hydraulic control valve 40 is returned to the locking mode.

Thereafter, the process proceeds to Step 207, and a predetermined time (a time interval at which the locking time filling control is executed periodically) is set. More specifically, referring to a map of the predetermined time (not illustrated), the predetermined time according to the engine rotational speed and the oil temperature (the temperature of the hydraulic oil) is set. Here, there is a tendency that the hydraulic oil inside the back space 39 can be taken out more easily as the engine rotational speed is higher, and the hydraulic oil inside the back space 39 can be taken out more easily as the oil temperature is higher (namely, as the viscosity of the hydraulic oil is lower). Considering such characteristics, the map of the predetermined time is set so that the predetermined time becomes shorter as the engine rotational speed is higher and that the predetermined time becomes shorter as the oil temperature becomes higher. This map of the predetermined time is prepared beforehand based on the test data, design data, and the like, and is stored in the ROM of the ECU 21.

Thereafter, the process proceeds to Step 208, whether or not the lock demand of the camshaft phase has been released is determined. When it is determined that the lock demand has not been released, the process of Steps 209-212 is executed repeatedly.

First, the process proceeds to Step 209, and whether or not the predetermined time has elapsed after finishing the locking time filling control is determined by whether or not the count value of a timer that measures the elapsed time from the time point of finishing the locking time filling control (for example, the time point when the control mode of the hydraulic control valve 40 is returned to the locking mode) has reached the predetermined time. When it is determined in this Step 209 that the predetermined time has not elapsed after finishing the locking time filling control, the process returns to Step 208 described above.

Thereafter, in step 209 described above, at the time point when it is determined that the predetermined time has elapsed after finishing the locking time filling control, the locking time filling control is executed. First, in step 210, the control mode of the hydraulic control valve 40 is switched to the filling mode, the hydraulic oil is supplied to the timing advance chamber 26, both of the timing advance chamber 26 and the timing retard chamber 27 are filled with the hydraulic oil, the back space 39 is filled with the hydraulic oil, and thereafter, in Step 211, the control mode of the hydraulic control valve 40 is returned to the locking mode. Thereafter, the process proceeds to Step 212, the count value of the timer is reset, and the process returns to Step 208 described above.

Thereafter, at the time point when it is determined that the lock demand has been released in Step 208, the present routine is finished.

In the present second embodiment explained above, it is configured to execute the locking time filling control repeatedly every time the predetermined time elapses until the lock demand is released after executing the locking time filling control (the control of returning the control mode to the locking mode after switching the control mode to the filling mode and filling the back space 39 with the hydraulic oil) in a state the control mode is switched to the locking mode when the lock of the camshaft phase occurs. Thus, even when the lock demand of the camshaft phase continues comparatively long, it is possible to execute the locking time filling control periodically and to maintain the back space in a state of being filled with the hydraulic oil, it is possible to minimize the adverse effect such as drop of the engine oil pressure caused by that the filling control is continued for a long time, and therefore the noise suppression effect can be effectively maintained until the lock demand of the camshaft phase is released.

Also, in the present second embodiment, it is configured to set the predetermined time (a time interval at which the locking time filling control is executed periodically) according to the engine rotational speed and the oil temperature. Thus, the predetermined time can be set to an appropriate interval (an interval suitable to maintain the back space 39 in a state of being filled with the hydraulic oil) by changing the predetermined time responding to change of the degree of easiness of extracting (or the degree of difficulty of extracting) the hydraulic oil inside the back space according to the engine rotational speed and the oil temperature.

Further, although it is configured to set the predetermined time according to both of the engine rotational speed and the oil temperature in the present second embodiment described above, the present invention is not limited to it, and it may also be configured to set the predetermined time according to only one of the engine rotational speed and the oil temperature. Alternatively, the predetermined time may be a fixed value set beforehand.

Third Embodiment

Next, the third embodiment of the present disclosure will be explained using FIG. 9 to FIG. 11. However, explanation of the portion substantially same to the first embodiment described above will be omitted or simplified, and the portion different from the first embodiment described above will be mainly explained.

In the filling mode, because the hydraulic oil is supplied to the timing advance chamber 26 and the hydraulic oil is filled in the order of the timing advance chamber 26, the back space 39, and the timing retard chamber 27, it is possible that the timing retard chamber 27 cannot be filled with the hydraulic oil sufficiently according to circumstances (for example, the air may possibly remain inside the timing retard chamber 27).

Figure 11:
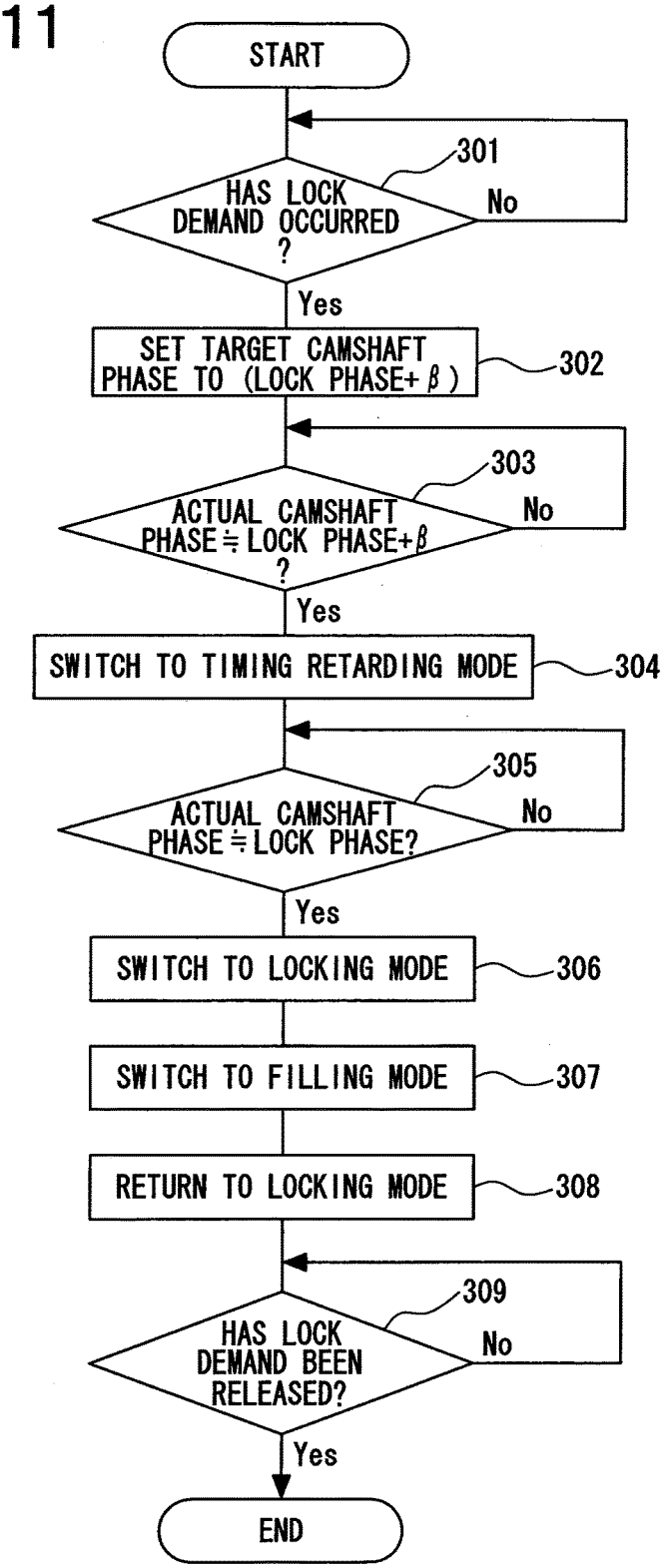
FIG. 11 is a flowchart showing the process flow of a locking time filling control routine of the third embodiment.

Therefore, in the present third embodiment, it is configured to switch the control mode to the timing retarding mode (a mode of supplying the hydraulic oil to an oil pressure chamber on the opposite side of an oil pressure chamber where the hydraulic oil is filled with first in the filling mode out of the timing advance chamber 26 and the timing retard chamber 27) before switching the control mode to the locking mode when the lock demand of the camshaft phase occurs by executing the locking time filling control routine of FIG. 11 described below by the ECU 21.

Figure 9:
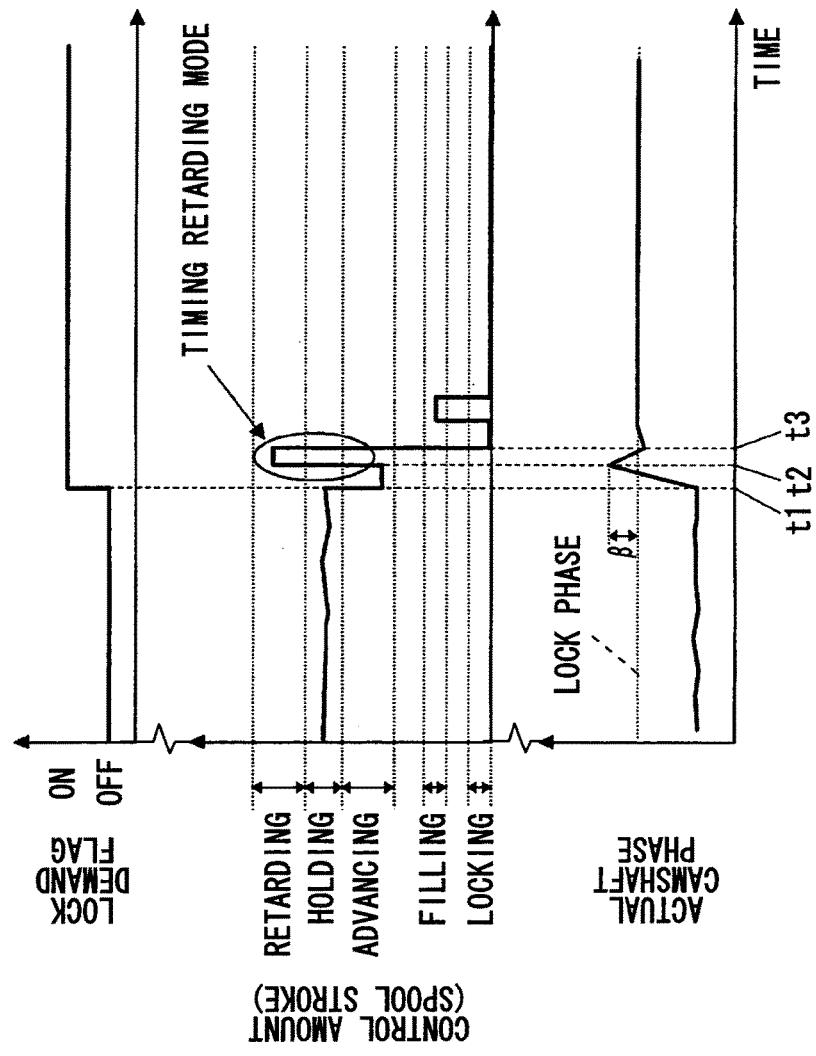
FIG. 9 is a time chart showing an execution example of the locking time filling control of the third embodiment.

More specifically, as shown in FIG. 9, the target camshaft phase is set to (lock phase+β) at the time point t1 when the lock demand of the camshaft phase occurs (the time point when the lock demand flag is switched to ON), and the actual camshaft phase is controlled to (lock phase+β) by the phase F/B control.

Figure 10A:
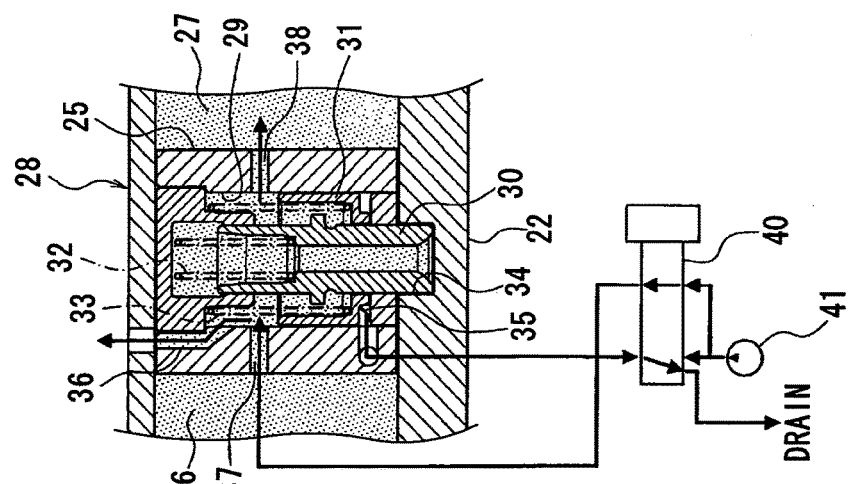
FIGS. 10A to 10C are drawings for explaining the locking time filling control of the third embodiment.

Thereafter, at the time point t2 when it is determined that the actual camshaft phase has generally agreed with (lock phase+β), the control mode of the hydraulic control valve 40 is switched to the timing retarding mode (the control amount of the hydraulic control valve 40 is set to within the control area of the timing retarding mode), the hydraulic oil is supplied to the timing retard chamber 27, the actual camshaft phase is returned to the lock phase, and the timing retard chamber 27 is filled with the hydraulic oil (refer to FIG. 10A).

Figure 10B:
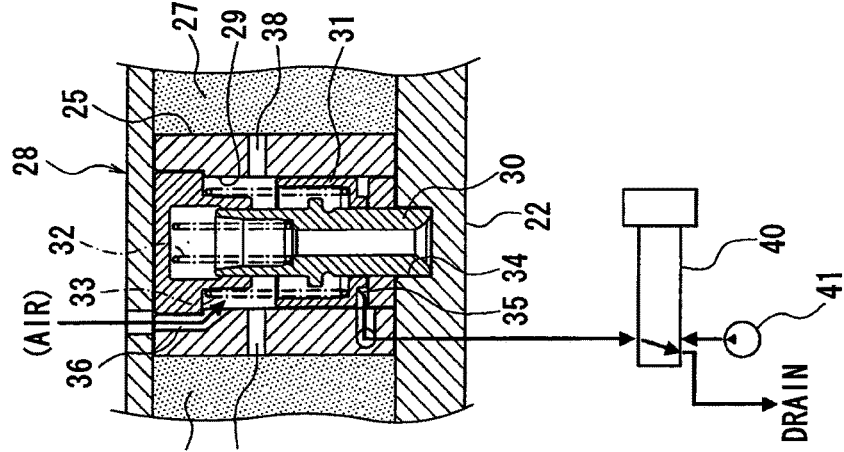
Figure 10C:
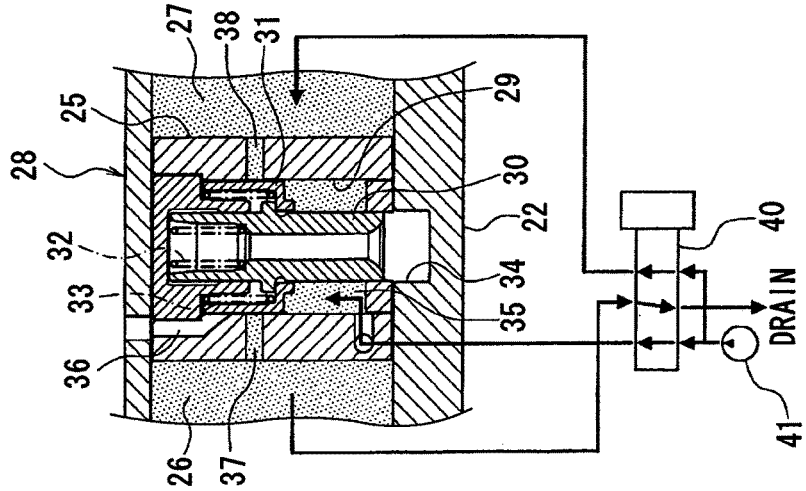

Thereafter, at the time point t3 when it is determined that the actual camshaft phase has generally agreed with the lock phase, the control mode of the hydraulic control valve 40 is switched to the locking mode, and the lock pin (the inner pin 30 and the outer pin 31) is moved to the lock position (refer to FIG. 10B).

Thereafter, the locking time filling control is executed. In this locking time filling control, first, the control mode of the hydraulic control valve 40 is switched to the filling mode, the hydraulic oil is supplied to the timing advance chamber 26, both of the timing advance chamber 26 and the timing retard chamber 27 are filled with the hydraulic oil, and the back space 39 is filled with the hydraulic oil (refer to FIG. 10C). Thereafter, the control mode of the hydraulic control valve 40 is returned to the locking mode, and supply of the hydraulic oil to the timing advance chamber 26 is stopped.

Below, the process contents of the locking time filling control routine of FIG. 11 executed by the ECU 21 in the present third embodiment will be explained.

In the locking time filling control routine shown in FIG. 11, first, in Step 301, whether or not a lock demand of the camshaft phase has occurred is determined, the process proceeds to Step 302 at the time point when it is determined that the lock demand has occurred, the target camshaft phase is set to (lock phase+β), and the actual camshaft phase is controlled to (lock phase-β) by the phase F/B control.

Thereafter, the process proceeds to Step 303, and whether or not the actual camshaft phase has generally agreed with (lock phase+β) is determined by whether or not the difference (absolute value) of the actual camshaft phase and (lock phase+β) has become equal to or less than a predetermined value for example.

In this Step 303, at the time point when it is determined that the actual camshaft phase has generally agreed with (lock phase+β), the process proceeds to Step 304, the control mode of the hydraulic control valve 40 is switched to the timing retarding mode, the hydraulic oil is supplied to the timing retard chamber 27, the actual camshaft phase is returned to the lock phase, and the timing retard chamber 27 is filled with the hydraulic oil.

Thereafter, the process proceeds to Step 305, and whether or not the actual camshaft phase has generally agreed with the lock phase is determined. At the time point when it is determined that the actual camshaft phase has generally agreed with the lock phase, the process proceeds to Step 306, the control mode of the hydraulic control valve 40 is switched to the locking mode, and the lock pin (the inner pin 30 and the outer pin 31) is moved to the lock position.

Thereafter, the locking time filling control is executed. First, in step 307, the control mode of the hydraulic control valve 40 is switched to the filling mode, the hydraulic oil is supplied to the timing advance chamber 26, both of the timing advance chamber 26 and the timing retard chamber 27 are filled with the hydraulic oil, the back space 39 is filled with the hydraulic oil, and thereafter, in Step 308, the control mode of the hydraulic control valve 40 is returned to the locking mode.

Thereafter, the process proceeds to Step 309, whether or not the lock demand of the camshaft phase has been released is determined, and the present routine is finished at the time point when it is determined that the lock demand has been released.

In the present third embodiment explained above, it is configured to switch the control mode to the timing retarding mode (a mode of supplying the hydraulic oil to an oil pressure chamber on the opposite side of an oil pressure chamber where the hydraulic oil is filled with first in the filling mode out of the timing advance chamber 26 and the timing retard chamber 27) before switching the control mode to the locking mode when the lock demand of the camshaft phase occurs. Thus, because the timing retard chamber 27 can be filled with the hydraulic oil (the air inside the timing retard chamber 27 can be extracted) beforehand, in the filling mode, even if there is a circumstance that the hydraulic oil is supplied to the timing advance chamber 26 and that the timing advance chamber 26, the back space 39, and the timing retard chamber 27 are filled with the hydraulic oil in this order, a state that both of the timing advance chamber 26 and the timing retard chamber 27 are filled with the hydraulic oil sufficiently can be achieved. Thus, the excitation force of the vibration (rattling) of the inner pin 30 can be damped, and the noise suppression effect can be enhanced further.

Also, in the present third embodiment described above, because the present disclosure is applied to a system of supplying the hydraulic oil to the timing advance chamber 26 in the filling mode, it is configured to switch the control mode to the timing retarding mode and to fill the timing retard chamber 27 with the hydraulic oil before switching the control mode to the locking mode when a lock demand occurs. To the contrary, when the present disclosure is applied to a system of supplying the hydraulic oil to the timing retard chamber 27 in the filling mode, it is good to switch the control mode to the timing advancing mode and to fill the timing advance chamber 26 with the hydraulic oil before switching the control mode to the locking mode when a lock demand occurs.

Fourth Embodiment

Next, the fourth embodiment of the present disclosure will be explained referring to FIG. 12 and FIG. 13. However, explanation of the portion substantially same to the first embodiment described above will be omitted or simplified, and the portion different from the first embodiment described above will be mainly explained.

In the present fourth embodiment, it is configured to execute the stopping time filling control of returning the control mode to the locking mode after switching the control mode to the filling mode and filling the back space 39 with the hydraulic oil when an engine stop demand occurs by executing the stopping time filling control routine of FIG. 13 described below by the ECU 21.

Figure 12:
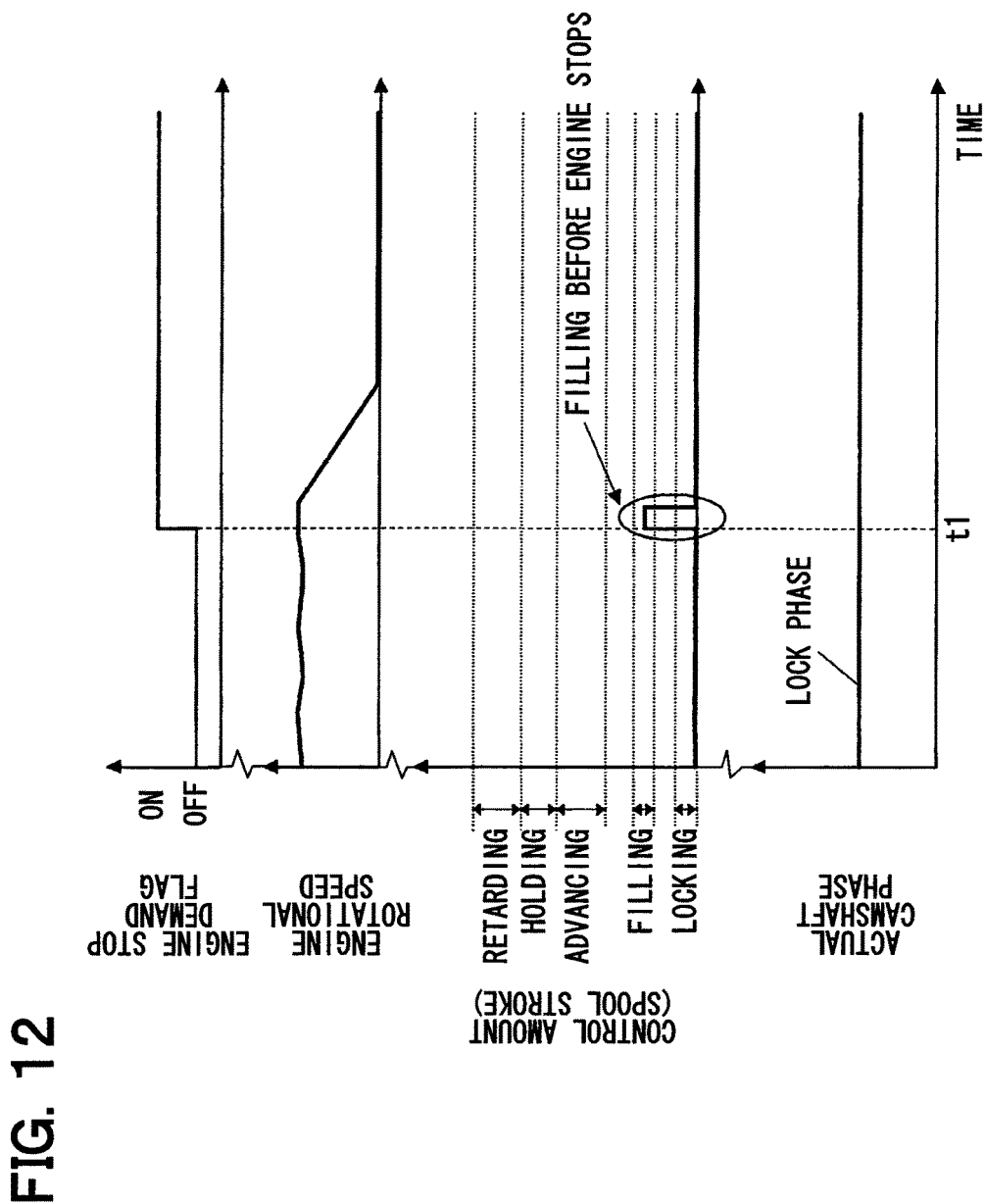
FIG. 12 is a time chart showing an execution example of the stopping time filling control of the fourth embodiment.

More specifically, as shown in FIG. 12, whether or not the control mode of the hydraulic control valve 40 is the locking mode is determined at the time point t1 when the engine stop demand occurs (the time point when the engine stop demand flag is switched to ON). As a result, when it is determined that the control mode of the hydraulic control valve 40 is the locking mode (refer to FIG. 12), the stopping time filling control is executed at the time point. In this stopping time filling control, first, the control mode of the hydraulic control valve 40 is switched to the filling mode (the control amount of the hydraulic control valve 40 is set to within the control area of the filling mode), the hydraulic oil is supplied to the timing advance chamber 26, both of the timing advance chamber 26 and the timing retard chamber 27 are filled with the hydraulic oil, and the back space 39 is filled with the hydraulic oil. Thereafter, the control mode of the hydraulic control valve 40 is returned to the locking mode, and supply of the hydraulic oil to the timing advance chamber 26 is stopped.

On the other hand, when it is determined that the control mode of the hydraulic control valve 40 is not the locking mode (not illustrated), the target camshaft phase is set to the lock phase, and the target camshaft phase is controlled to the lock phase (target camshaft phase) by the phase F/B control. Thereafter, the stopping time filling control (the control of returning the control mode to the locking mode after the control mode is switched to the filling mode and the back space 29 is filled with the hydraulic oil) is executed in a state the control mode of the hydraulic control valve 40 is switched to the locking mode and the lock pin (the inner pin 30 and the outer pin 31) is moved to the lock position.

Below, the process contents of the stopping time filling control routine of FIG. 13 executed by the ECU 21 in the present fourth embodiment will be explained.

Figure 13:
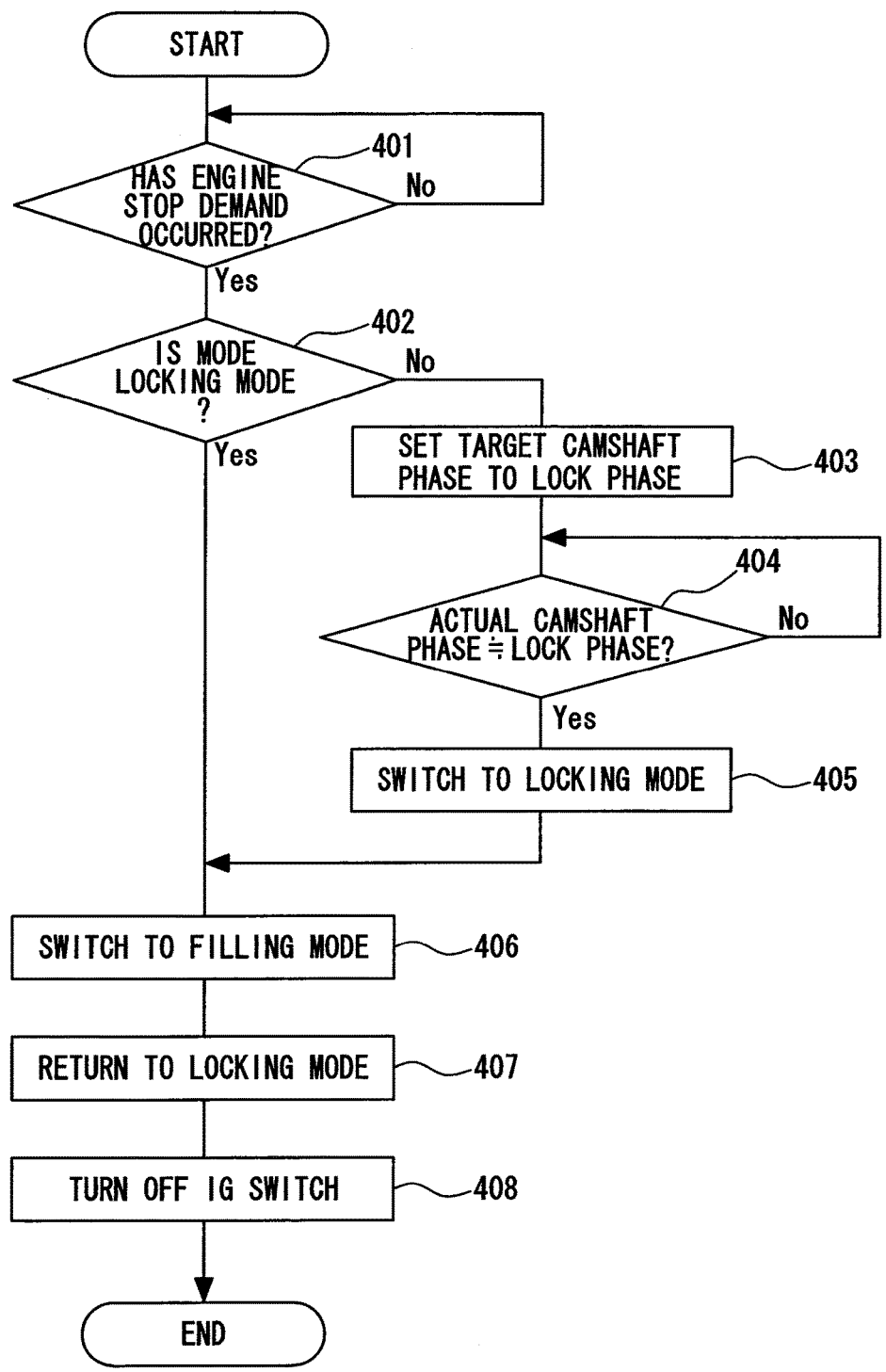
FIG. 13 is a flowchart showing the process flow of a stopping time filling control routine of the fourth embodiment.

In the stopping time filling control routine shown in FIG. 13, first, in Step 401, whether or not an engine stop demand has occurred is determined. At the time point when it is determined that the engine stop demand has occurred, the process proceeds to Step 402, and whether or not the control mode of the hydraulic control valve 40 is the locking mode (whether or not the camshaft phase is locked at the lock phase) is determined.

When it is determined that the control mode of the hydraulic control valve 40 is the locking mode (the camshaft phase is locked at the lock phase) in Step 402, the stopping time filling control is executed at the time point. First, in Step 406, the control mode of the hydraulic control valve 40 is switched to the filling mode, the hydraulic oil is supplied to the timing advance chamber 26, both of the timing advance chamber 26 and the timing retard chamber 27 are filled with the hydraulic oil, and the back space 39 is filled with the hydraulic oil. Thereafter, the control mode of the hydraulic control valve 40 is returned to the locking mode in Step 407.

Thereafter, the process proceeds to Step 408, the IG switch (ignition switch) is turned off, the engine 11 is stopped, and the present routine is finished.

On the other hand, when it is determined that the control mode of the hydraulic control valve 40 is not the locking mode (the camshaft phase is not locked at the lock phase) in Step 402 described above, the process proceeds to Step 403, the target camshaft phase is set to the lock phase, and the target camshaft phase is controlled to the lock phase (target camshaft phase) by the phase F/B control.

Thereafter, the process proceeds to Step 404, whether or not the actual camshaft phase has generally agreed with the lock phase is determined, the process proceeds to Step 405 at the time point when it is determined that the actual camshaft phase has generally agreed with the lock phase, the control mode of the hydraulic control valve 40 is switched to the locking mode, and the lock pin (the inner pin 30 and the outer pin 31) is moved to the lock position.

Thereafter, the stopping time filling control is executed. First, in Step 406, the control mode of the hydraulic control valve 40 is switched to the filling mode, the hydraulic oil is supplied to the timing advance chamber 26, both of the timing advance chamber 26 and the timing retard chamber 27 are filled with the hydraulic oil, and the back space 39 is filled with the hydraulic oil. Thereafter, the control mode of the hydraulic control valve 40 is returned to the locking mode in Step 407.

Thereafter, the process proceeds to Step 408, the IG switch is turned off, the engine 11 is stopped, and the present routine is finished.

In the present fourth embodiment described above, it is configured to execute the stopping time filling control of returning the control mode to the locking mode after switching the control mode to the filling mode and filling the back space 39 with the hydraulic oil when the engine stop demand occurs. Thus, the noise (rattling noise) generated by vibration of the inner pin 30 at the time of the phase lock at the time of the engine start (at the time of start after idling stop for example) of the next time can be suppressed.

Also, in the present fourth embodiment, it is configured to execute the stopping time filling control in a state the control mode is switched to the locking mode and moving the lock pin to the lock position in a case whether or not the control mode of the hydraulic control valve 40 is the locking mode is determined and it is determined not to be the locking mode when the engine stop demand occurs. With such a configuration, even when the control mode is not the locking mode (when the camshaft phase is not locked) when the engine stop demand occurs, it is possible to execute the stopping time filling control after switching the control mode to the locking mode and locking the camshaft phase.

Further, although respective embodiments 1-4 described above are the embodiments materialized by applying the present disclosure to the variable valve timing device of the intake valve, the present disclosure may also be implemented by being applied to the variable valve timing device of the exhaust valve.

Furthermore, the present disclosure can be implemented with the configurations being changed variously within a range not departing from the object such that the configuration of the variable valve timing device 18, the configuration of the lock mechanism 28, the configuration of the hydraulic control valve 40, and the like may be appropriately changed.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A variable valve timing control device of an internal combustion engine, comprising:

a hydraulic drive type variable valve timing device that changes a rotation phase of a camshaft, which is referred to as a camshaft phase, with respect to a crankshaft of an internal combustion engine and adjusts a valve timing;

a lock mechanism that includes a lock pin movable between a lock position for locking the camshaft phase at a predetermined lock phase and a lock release position for releasing lock of the camshaft phase and includes a lock pin storing hole wherein a back space is formed between a circumference of the lock pin and the lock pin storing hole when the pin is in the lock position;

a hydraulic control valve that controls an oil pressure that drives the variable valve timing device and the lock mechanism; and a control unit that is configured to switch a control mode of the hydraulic control valve among:

a timing advancing mode for supplying a hydraulic oil to a timing advance chamber of the variable valve timing device and advancing the camshaft phase, a timing retarding mode for supplying the hydraulic oil to a timing retard chamber of the variable valve timing device and retarding the camshaft phase, a holding mode for holding the oil pressure of the timing advance chamber and the timing retard chamber and holding the camshaft phase, a locking mode for releasing the oil pressure of an oil pressure chamber of the lock mechanism and moving the lock pin to the lock position, and a filling mode for filling the back space with the hydraulic oil, wherein the control unit is configured to execute a locking time filling control of that switches the control mode to the filling mode to fill the back space with the hydraulic oil after the control mode is switched to the locking mode and while the lock pin is in the lock position, and thereafter returning the control mode to the locking mode when a lock demand of the camshaft phase occurs.

2. The variable valve timing control device of an internal combustion engine according to claim 1, wherein
   the control unit fills both the timing advance chamber and the timing retard chamber with the hydraulic oil through the back space by supplying the hydraulic oil to one of the timing advance chamber and the timing retard chamber in a state the timing advance chamber and the timing retard chamber communicate with each other in the filling mode.

3. The variable valve timing control device of an internal combustion engine according to claim 2, wherein
   the control unit switches the control mode to a mode of supplying the hydraulic oil to an oil pressure chamber on the opposite side of an oil pressure chamber where the hydraulic oil is filled with first in the filling mode out of the timing advance chamber and the timing retard chamber before switching the control mode to the locking mode when the lock demand of the camshaft phase occurs.

4. The variable valve timing control device of an internal combustion engine according to claim 1, wherein
   the control unit repeatedly executes the locking time filling control every time a predetermined period elapses until the lock demand of the camshaft phase is released.

5. The variable valve timing control device of an internal combustion engine according to claim 4, wherein the control unit sets the predetermined period according to at least either of the rotational speed of the internal combustion engine and the temperature of the hydraulic oil.

6. A variable valve timing control device of an internal combustion engine, comprising:
- a hydraulic drive type variable valve timing device that changes a rotation phase of a camshaft, which is referred to as a camshaft phase, with respect to a crankshaft of an internal combustion engine and adjusts a valve timing;
- a lock mechanism that includes a lock pin movable between a lock position for locking the camshaft phase at a predetermined lock phase and a lock release position for releasing a lock of the camshaft phase and includes a lock pin storing hole, wherein a back space is formed between a circumference of the lock pin and the lock pin storing hole when the pin is in the lock position;
- a hydraulic control valve that controls the oil pressure that drives the variable valve timing device and the lock mechanism; and
- a control unit that is configured to switch the control mode of the hydraulic control valve among:
  - a timing advancing mode for supplying a hydraulic oil to a timing advance chamber of the variable valve timing device and advancing the camshaft phase,
  - a timing retarding mode for supplying the hydraulic oil to a timing retard chamber of the variable valve timing device and retarding the camshaft phase,
  - a holding mode for holding the oil pressure of the timing advance chamber and the timing retard chamber and holding the camshaft phase,
  - a locking mode for releasing the oil pressure of an oil pressure chamber of the lock mechanism and moving the lock pin to the lock position, and
  - a filling mode for filling the back space with the hydraulic oil, wherein the control unit is configured to execute a stopping time filling control that switches the control mode to the filling mode to fill the back space with the hydraulic oil after the control mode is switched to the locking mode and while the lock pin is in the lock position, and thereafter returns the control mode to the locking mode when a stopping demand of the internal combustion engine occurs.

7. The variable valve timing control device of an internal combustion engine according to claim 6, wherein
the control unit executes the stopping time filling control in a state the control mode is switched to the locking mode and the lock pin is moved to the lock position when whether or not the control mode is the locking mode is determined and the control mode is determined not to be the locking mode when the stop demand of the internal combustion engine occurs.

* * * * *